(12) United States Patent
Banks et al.

(10) Patent No.: US 7,451,476 B1
(45) Date of Patent: Nov. 11, 2008

(54) METHOD AND APPARATUS FOR INTERFACING A NETWORK TO AN EXTERNAL ELEMENT

(75) Inventors: Robert Banks, Barrington, IL (US); Wesley S Jones, Palatine, IL (US); Richard Malcolm, Carol Stream, IL (US)

(73) Assignee: Motorola, Inc., Schaumburg, IL (US)

( * ) Notice: Subject to any disclaimer, the term of this patent is extended or adjusted under 35 U.S.C. 154(b) by 1031 days.

(21) Appl. No.: 09/597,315

(22) Filed: Jun. 20, 2000

(51) Int. Cl.
*H04K 1/00* (2006.01)
*H04H 20/71* (2008.01)
*H04M 11/00* (2006.01)

(52) U.S. Cl. .......................... 726/1; 713/153; 713/166; 713/169; 726/2; 726/3; 726/4; 726/12; 709/223; 709/225; 709/229; 455/3.01; 455/3.02; 455/408; 455/426.1

(58) Field of Classification Search ................. 713/153, 713/169, 166, 200–201; 455/3.01–3.02, 455/410–411; 709/223–229; 280/247, 250, 280/270; 726/1–6, 14–15, 21
See application file for complete search history.

(56) References Cited

U.S. PATENT DOCUMENTS

| | | | | |
|---|---|---|---|---|
| 5,497,463 | A * | 3/1996 | Stein et al. | 709/203 |
| 6,002,941 | A * | 12/1999 | Ablay et al. | 455/518 |
| 6,012,100 | A * | 1/2000 | Frailong et al. | 709/250 |
| 6,285,667 | B1 * | 9/2001 | Willars et al. | 370/329 |
| 6,377,804 | B1 * | 4/2002 | Lintulampi | 455/435.2 |
| 6,385,451 | B1 * | 5/2002 | Kalliokulju et al. | 455/437 |
| 6,430,407 | B1 * | 8/2002 | Turtiainen | 455/411 |
| 6,591,417 | B1 * | 7/2003 | Strysniewicz et al. | 717/168 |
| 6,683,860 | B1 * | 1/2004 | Forssell et al. | 370/329 |
| 2001/0032254 | A1 * | 10/2001 | Hawkins | 709/219 |

FOREIGN PATENT DOCUMENTS

EP            1 083 722 A      3/2001

OTHER PUBLICATIONS

Jormalainen S. and Laine J.: "Security in the WTLS", Internet Citation, Nov. 30, 1999, XP002167503.
Inoue A et al Pinnacle Group: "IP Layer Security and Mobility Support Design Policy and an Implementation", ISS '97, World Telecommunications Congress, (International Switching Symposium), Toronto, Sep. 21-26, 1997, vol. 1, Sep. 21, 1997, pp. 571-577.

* cited by examiner

*Primary Examiner*—Kristine Kincaid
*Assistant Examiner*—Jenise E Jackson

(57) ABSTRACT

A services delivery element (26) forms an interface between an external element (such as an external end user's network feature server) and a communication network including both a core network (10) and an access network (12). The services delivery element (26) provides access to the core network (10) and access networks (12) to which the external element is interfaced.

37 Claims, 2 Drawing Sheets

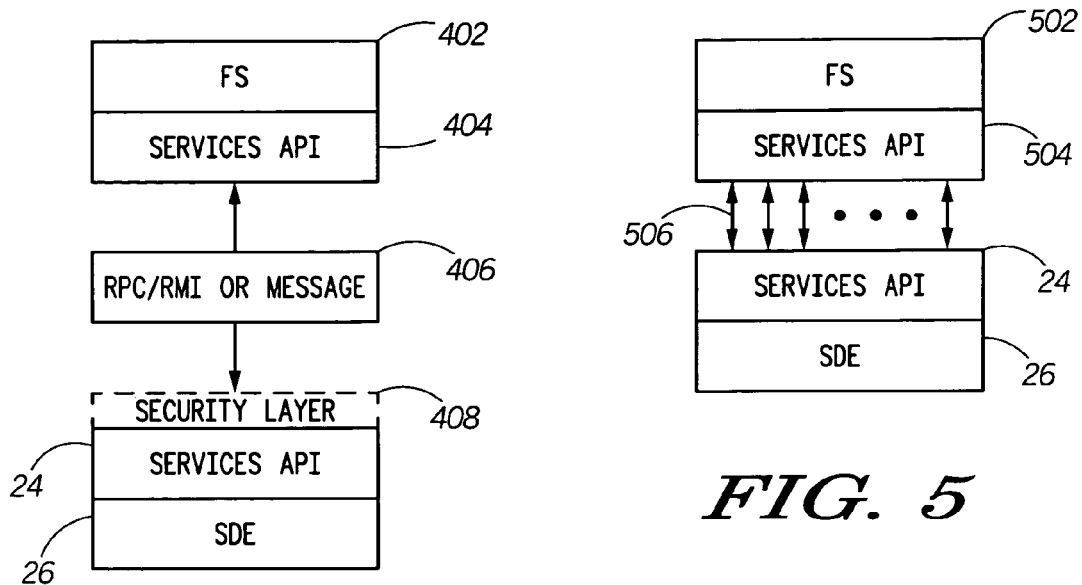
FIG. 4
FIG. 5
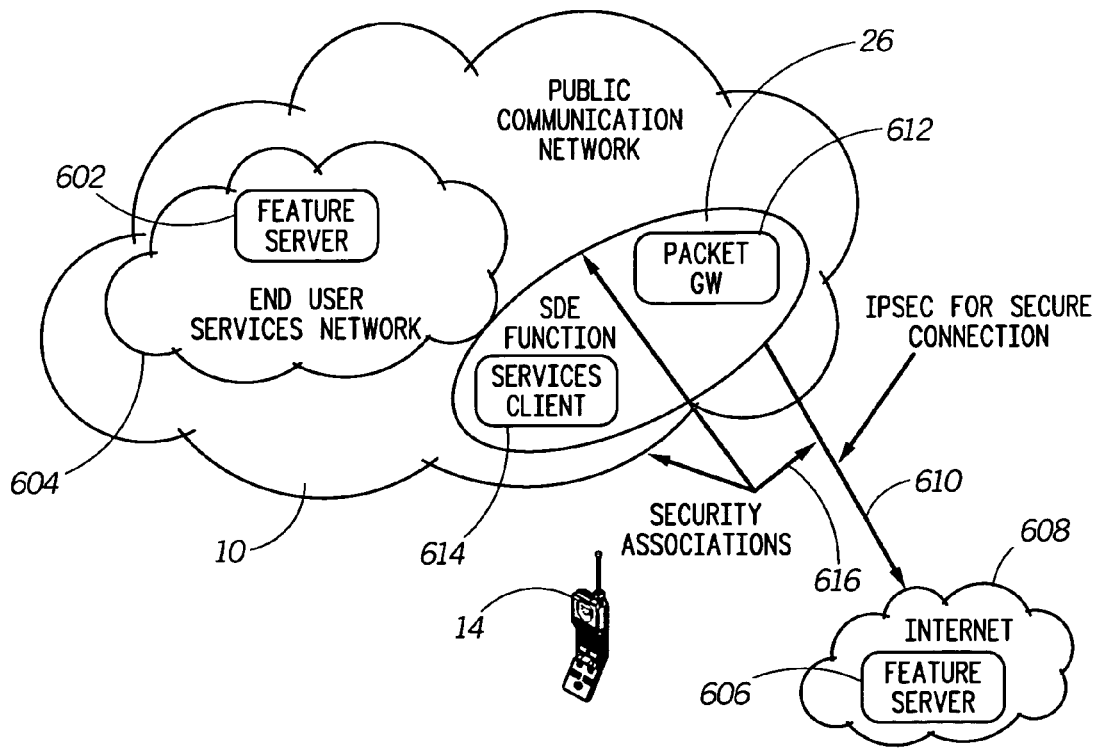
FIG. 6

METHOD AND APPARATUS FOR INTERFACING A NETWORK TO AN EXTERNAL ELEMENT

FIELD OF THE INVENTION

The invention relates generally to communication networks, and more particularly, the invention relates to a method and apparatus for interfacing a communication network to an external element.

BACKGROUND OF THE INVENTION

A communication network is typically designed to provide a vast array of functions and services to the users of the network. At the same time, new functions and features are conceived and developed that may enhance the communication network. Some of these new functions may lie outside the architecture of the existing communication network. Adaptation of these new functions to the communication network may require costly redesign and implementation of the communication network. Moreover, the communication network may be designed with a proprietary architecture and data structure that limits an ability to directly integrate these newly developed functions.

Other desirable features and functions may be resident within other networks external to the communication network. Benefits may be derived from providing these features and functions within the communication network, or to at least permit users of the communication network to utilize these features and functions that reside on the external network.

Certain communication network architectures are designed with a view toward feature extraction. Feature extraction refers to the adaptability of the network to new services, features and functions that may be developed by virtually anyone including service providers, system operators, third party vendors and end-users.

To permit adaptation of newly developed functionality to the communication network, and/or to permit utilization of external network functionality by users of the communication network, it is necessary to interface the new functions to the communication network in a stable and secure manner.

Thus, there is a need for a method and apparatus for interfacing a network to an external element in a stable and secure manner.

BRIEF DESCRIPTION OF THE DRAWINGS

FIG. 4 is a functional block diagram of a services delivery element in accordance with one of the preferred embodiments of the invention illustrating further functionality of the services delivery element.

FIG. 5 is a functional block diagram illustrating services invocation between a communication network and an external element in accordance with one of the preferred embodiments of the present invention.

FIG. 6 is a block diagram illustration of a communication network coupled to an external element by an apparatus in accordance with a preferred embodiment of the present invention.

DETAILED DESCRIPTION OF THE PREFERRED EMBODIMENTS

A services delivery element forms an interface or operates as an interface device between an external element (such as an external end user's network feature server) and a communication network including both a core network and at least one access network. The services delivery element provides access to the core network, access networks and subscriber devices within or connected to the access networks to which the external element is interfaced. In accordance with a first aspect of the invention, the services delivery element acts as a security proxy and a secure link point between the external element and the core network. The services delivery element may also provide managed access by the external element to core network and access network resources. In addition to the above-described features, the services delivery element may also recognize or identify trusted external elements; identify preferential external elements; provide secure access to subscriber data retained within the core network; identify and deny access by untrusted external elements; translate between the external element and the core network; and provide limited access to particular subsets of core network data and/or functions by the external element.

Figure 1:
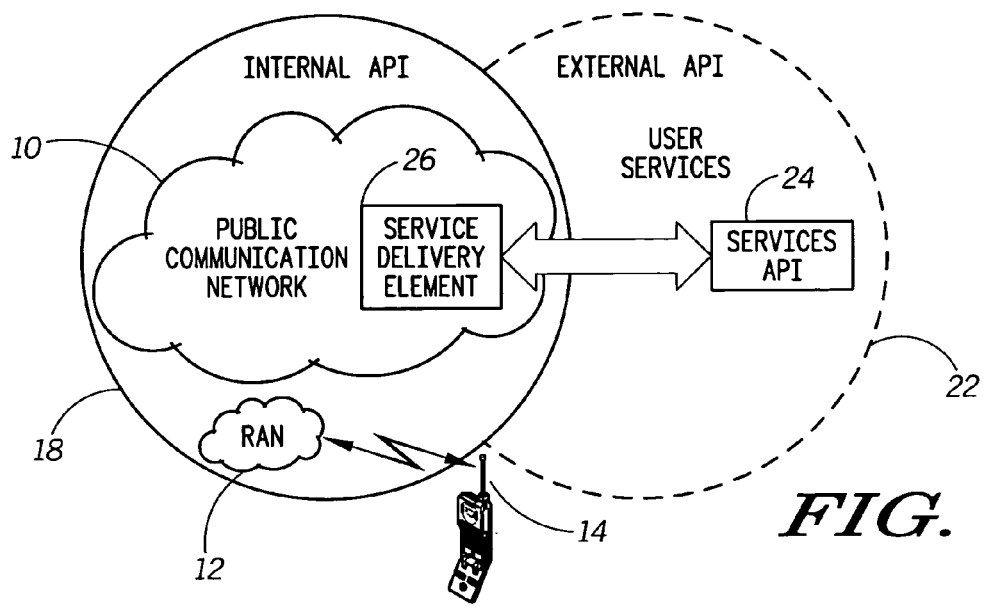
FIG. 1 is a block diagram illustration of a communication network coupled to an external element by an apparatus in accordance with a preferred embodiment of the present invention.

With reference to FIG. 1, a core network 10 is interfaced to an access network 12. The core network 10 may be a packet based communication network adapted to provide voice and data communication services via the access network 12, which may be a radio access network. A radio access network provides wireless voice and data communication services to a mobile unit, such as the mobile unit 14, and may do so in accordance with virtually any wireless communication protocol. The invention provides an interface for external elements to both the core network 10, the access network 12, and the mobile unit 14. To simplify the following discussion of the preferred embodiments of the invention, reference is made only to the core network 10.

Figure 2:
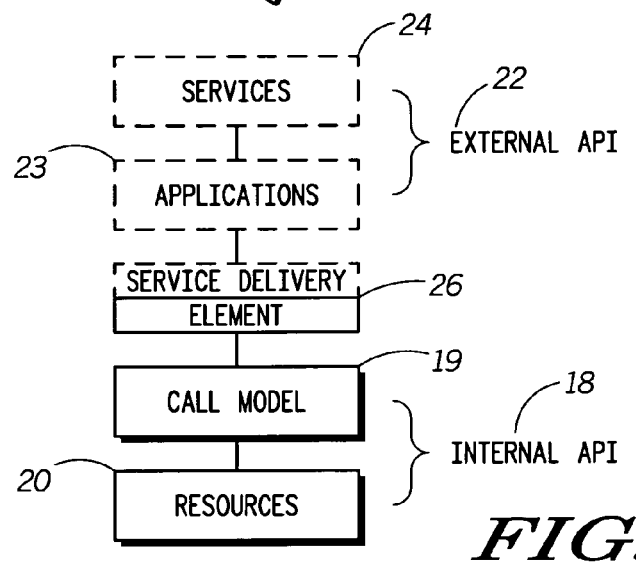
FIG. 2 is a functional block diagram illustrating the interface of an external element to a communication network in accordance with a preferred embodiment of the present invention.

Referring to FIG. 1 and FIG. 2, within the core network 10 is a variety of application program interfaces (API) 18, which interface services and functional components within the core network 10. As shown in FIG. 2, for example, is a call model API 18 and a resource API 20. Each of API 19 and API 20 are considered to be internal APIs, and as such have "trusted" status within the core network 10. That is, these APIs have access to the core network 10 without having to first authenticate and establish a secure interface with the core network. Also illustrated in FIG. 2 are external APIs 22, such as applications API 23 and services API 24. While only two external APIs 23 and 24 are shown, it should be understood that numerous external APIs might be provided.

External APIs 22 are considered "untrusted" APIs and do not have the same, direct access to the core network 10 as the trusted, internal APIs 18. The internal APIs 18 may be considered the "glue" of core network 10, which enable the features and services in the core network 10. As an example, the internal APIs support the configuration of the communication between the network entities (not shown) within the core network 10.

In contrast, the external APIs 22 are accessible to and configurable by third parties, e.g., services providers and, where appropriate, end users. The external APIs 22 are the feature extraction pieces that enable third party developers to access and add features and services to the network. The external APIs 22 interface with the internal APIs 18 to configure, communicate with and control the network to provide extensibility to the core network 10. In accordance with a preferred embodiment of the invention, the external APIs 22 and internal APIs 18 are linked together via a services delivery element 26. The services delivery element 26 segregates the sets of APIs, and has a primary purpose to provide security for the internal APIs from untrusted resources.

Because the external APIs 22 connect to the core network 10, it is possible that mechanisms may be added to the core network 10 via these external APIs 22, that can be damaging or even totally destructive. Any service, not resident within the core network 10, that requires the execution of programmable code, that requires processing from a core network entity, or data access on behalf of a subscriber from the core, is considered external. These services, such as the Call Processing Language from the IPTEL working group of the Internet Engineering Task Force (IETF) or some features of the Wireless Application Protocol (WAP), enable end users to load executable code into the network. These services cannot be trusted and should not be granted direct access to the core network 10.

As discussed above, the internal APIs 18 are the system interfaces which enable features and services in the core network 10. The internal APIs 18 address the configuration of and communication between the network entities inside both the core and access networks 10 and 12. These interfaces will not be directly accessible external to the core network 10.

Figure 3:
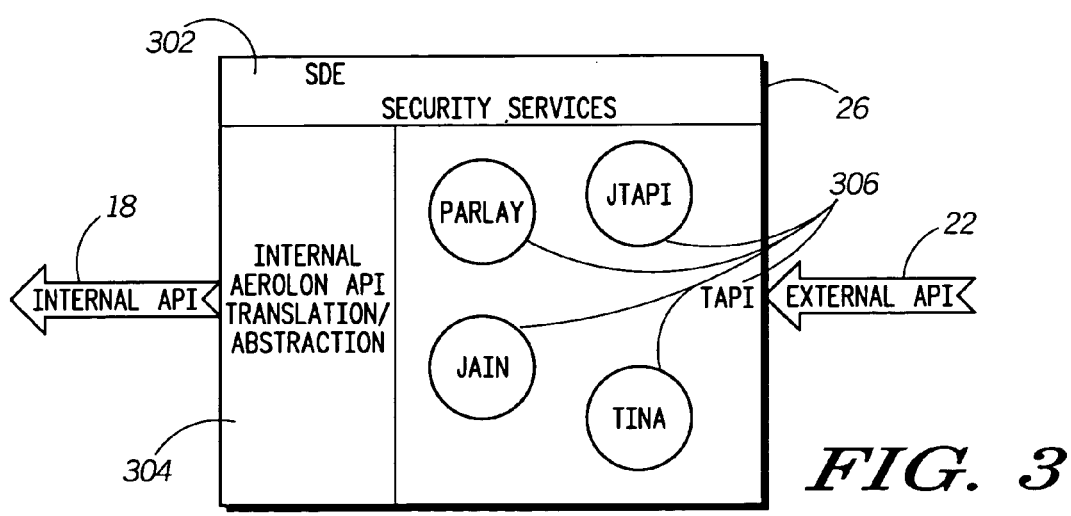
FIG. 3 is a functional block diagram illustration of a services delivery element in accordance with a preferred embodiment of the invention.

The services delivery element 26 protects the core network 10 from potentially destructive features and services, and further provides indirect access to the internal APIs 18. FIG. 3 illustrates a functional architecture for the services delivery element 26 in accordance with a preferred embodiment of the invention. The services delivery element 26 may include both a security services element 302 and a translation/API modules element 304. One of ordinary skill in the art will appreciate that FIG. 3 represents the functional elements of the services delivery element 26, and that in an actual physical embodiment of the services delivery element 26, these functional elements may reside in one or more components of the core network 10.

The security services elements 302 provides authentication and validation services to potential service and feature providers of the network. In accordance with the preferred embodiments of the invention, access to the core network 10 by external elements, i.e., external APIs 22, are via a secure connection across a virtual private network (VPN) connection. The security services element 302 adds a wrapper on top of the internal API that will enable the external feature or service. This arrangement allows the external feature or service to have scalable access to the internal API 18, but through a secure technique. Access to the internal API 18 by the external elements ranges from no access to partial access to full access based on a variety of security variables. These variables include user based privileges (e.g., service options based on subscription information) and network variables (e.g., based on network usage and load). More generally speaking, the services delivery element 26 enables a layering of restrictions providing greater or lesser authorization to the external element based upon virtually any set of criteria, including without limitations those set forth above.

The connection security between the external API 22 and the internal API 18 may be provided using the IP security protocol (IPSec) from the Internal Engineering Task Force (IETF). Utilizing both the encapsulation payload (ESP) and authentication header (AH) services of IPSec, the security delivery element 26 will provide access control, connectionless integrity, data origin authentication, rejection of replayed packets, and confidentiality services. These services will be available for both TCP and UDP streams.

The services delivery element 26 may be configured to communicate in IPSec tunnel mode. In this mode of operation, both the external API 22 and the internal API 18 will authenticate and encrypt the entire IP source packet and wrap a new IP header around them. ESP in tunnel mode encrypts and optionally authenticates the entire inner IP packet, including the inner IP header. AH in tunnel mode authenticates the entire inner IP packet and selected portions of the outer IP header.

Since, as described, the services delivery element 26/external API 22 IPSec transmissions will be in tunnel mode, all of the hosts inside the core network 10 will communicate with the external API 22 without implementing IPSec. The unprotected packets generated by core network elements are tunneled through the services delivery element 26 by tunnel security associations. The internal APIs 18 may interact with the services delivery element 26 via the embedded security layer on the services delivery element 26. This level of security is implemented to authenticate and validate each particular external API 22.

In accordance with the preferred embodiments of the invention, the services delivery element 26 may be configured to recognize particular external APIs 22. For example, one third party vendor may have more access to the core network 10 than others. Such recognition may be based upon being a known services provider, type of service, or other criteria. Establishing such other criteria will be easily recognized by one having ordinary skill in the art. In this arrangement, the services API 24 will interact with the services delivery element 26 via the embedded Security Layer on the security delivery element 26. This level of security is implemented to authenticate and validate each particular external element, and provide an explicit security layer between the external elements and the core network 10.

External elements (e.g., Feature Server 606 (FIG. 6)) accessing the system via the External APIs 22 may be statically or dynamically associated with the network 10. For external services that are expected to be delivered to numerous subscribers the operator may configure the core network 10 so that the external API 22 associated with the external service remains statically connected to the core network 10 via this security technique at system initialization. In a dynamic case, when a subscriber requests a particular feature provided by an external element, the core network 10 interrogates the external element.

The associated external API 22 registers with the service delivery element 26, and the services delivery element 26 will authenticate the external element and grant the particular external API 22 access privileges based on this authentication. At this point the external element becomes a trusted element by obtaining the security information. This implies that an additional layer of software must be considered in addition to the external API 22 or that the external API 22 has a local component, which adds the security parameter. A failed security check results in the call to the external API 22 returning an exception.

It will be appreciated that the service delivery element 26 may apply additional or alternate treatments in the event of a failed security check. The treatment applied may depend on the context of the security check failure. For example, a service usage accounting record may be created for the attempted service request. The record could be populated with specific information regarding the attempt and the reason for the security check failure, i.e., the denial of services. In the event the incoming request involves an external caller trying to reach the mobile unit 14 or access data held within the service delivery element 26, additional treatments may be applied. By way of example, an external caller attempting to access the mobile unit 14, but denied access, may be connected to a recorded announcement or progress tone to convey the reason that the access was not granted. The external caller might also be directed to a web page to provide additional information about the failed access attempt.

The foregoing arrangement is illustrated in FIG. 4. An external feature server 402 and its associated services API 404 are coupled via a message layer 406 to a security layer 408. The security layer 408 interfaces via the external services API 24 to the services delivery element 26.

Once the external element is trusted to the services delivery element 26 a subscriber may attempt to access a given features provided by the external element. At this point, the core network 10 has access to the external element 402 via its associated API 404 and the security delivery element 26, but the subscriber does not have direct access, i.e., security rights, to the feature offerings of the external element. The subscriber requests the feature and then the services delivery element 26 passes a token on behalf of the subscriber to the external element. The token exchange, shown pictorially in FIG. 5, occurs at the start of the service dialog to enable a particular feature server 502 and its associated services API 504 and the associated service data to support the feature. Service data may be subscriber data such as profile information, location data, etc. An access token 506 is passed between the external API 22 and the services API 504 containing the service request data. It will be appreciated that there may be multiple levels of security checks before this data can be delivered outside the core network 10.

The token exchange and associated authentication lasts for the duration of the dialogue. It should be noted that the dialogue might be a single service request or equivalent to a registration, which may persist over a number of hours. The first external API call establishes the security relationship between the requestor and the external element. For the lifetime of the relationship, the subsequent external API calls are considered as being sourced by a trusted element. This assumes that the requestor has additional software to support the security check.

Once a security relationship has been established, the external element may need to gain access to additional resources or data within the core network 10. The service API 22 will allow an explicit renegotiation of the security relationship to expand the access granted the external element. This process may also be applied in a reverse fashion to limit the access granted to the external element. For long-lived security relationships, the relationship may be aged to ensure release of the relationship after a predetermined time. This time out period may also be combined with some other criteria, such as inactivity. Once the time out period has expired that external element would be required to re-establish its secure relationship as described herein.

Because services are being provided by external elements, each external element may not use a protocol that is entirely compatible with the internal APIs and/or the core network 10. The services delivery element 26 includes translation functions 304 and API modules 306 (FIG. 3) that translate the service requests from external elements to the known internal API services. This translation function will operate similar to a broker function, a protocol adapter, or a protocol gateway function. The available services will be determined by the authentication services of the security services offered by the services delivery element 26. For example, Java Telephony Application Interface (JTAPI) may be supported external to the core network 10 via a translation function 304 within the services delivery element 26. Other translation protocols that may be supported include PARLAY, Telephony Application Interface (TAPI), Java Advanced Intelligent Network (JAIN) and Telecommunication Information Networking Architecture (TINA), which are illustrated in FIG. 3.

The invention may be further illustrated by three use cases, of which two are illustrated in FIG. 6.

1. An external element 602 is hosted in the End User Services Network 604 co-located within the core network 10,
2. An external element 606 is located in or attached to a non-trusted, external network 608 such as the internet, and
3. An external element is located in a trusted or non-trusted external network such as a private service provider network (not shown in FIG. 6).

In the first case, the end-user services network 604 is a trusted entity in a trusted network within the core network 10. In this case the relationship implies a trusted external element accessible over a trusted link. The external element 602 is either imbedded in the trusted network or is represented as a trusted core network 10 entity. This case can be thought of as one where certain classes of services such as three-way voice calling, voice call forwarding, paging, electronic mail, and other "typical" services may be provisioned within the core network 10. As a result, trust is static and requires only service level access security per subscriber.

In the second case, the external element 606 resides in a network 608 attached to the Internet. In this case neither the link to the network 608 where the external element 606 resides nor the external element 606 itself is considered trusted. A secure link 610 between the core network 10 and the Internet point of attachment to the packet gateway 612 of the core network 10 must first be established followed by secure access between the mobile unit 14 and the external element 606. As shown in FIG. 6, the mobile unit 14 is provided access to the core network 10 via a trusted element, the services client 614 internal to the core network 10. If there is need for access to resources contained within the core network 10, secure access via security associations 616 is established between the internal APIs 18 and the external element 606, which would automatically invoke the security services in the services delivery element 26. The reverse case, where the external element 606 attempts unsolicited contact with a mobile unit 14, would require the external element establish a secure link with the core network 10 followed by successful security negotiation with the internal API 18 for service discovery. This would be necessary for actions such as subscriber endpoint location and discovery of subscriber device attributes and/or capabilities.

In the third case, the external element resides in an external, trusted, private network. This allows statically or dynamically negotiated trust between networks and between an external element and the core network 10 internal APIs 18 to be negotiated jointly or independently using persistent (i.e., logically or physically) or short-lived link states.

The present invention has been described in terms of several preferred embodiments. It will be appreciated that the invention may be altered or changed without departing from its fair scope. For example, the invention may be applied where an external element, such as an external API, is utilized for remote configuration of elements associated with the core network. Such an implementation would find beneficial use in a system permitting subscriber profile provisioning from a device other than the subscriber device itself. The layered restrictions possible through application of the services delivery element are advantageously utilized to increase or decrease authorization criteria, which may be leveraged to offer an external element for remote configuration. Thus, an external element may have administrative access to the system from an untrusted source.

The preferred embodiments of the invention are intended to be illustrative and should not be taken as limiting of the broad scope of the invention set forth in the following claims.

The invention claimed is:

1. An apparatus for interfacing a communication network to a feature server external to the network, the apparatus comprising:
   a service delivery element, wherein the service delivery element is within the communication network, the service delivery element comprising at least one internal interface to couple the service delivery element to other devices within the communication network, an external interface to couple the service delivery element to at least one feature server external to the communication network, an embedded security layer to authenticate the at least one feature server on the communication network and to provide a secure interface for the at least one feature server to the communication network through the external interface and a processor adapted to operate responsive to a control program stored within a memory associated with the processor; and wherein the service delivery element is operable to recognize the feature server, to negotiate security level between the feature server and the communication network, and to manage access by the feature server to the communication network.

2. The apparatus of claim 1, wherein the security level defines a level of access of the features server to the communication network.

3. The apparatus of claim 1, wherein, based upon the security level, the service delivery element restricts access by the feature server to at least one class of data retained within the communication network.

4. The apparatus of claim 1, wherein, based upon the security level, the service delivery element restricts access by the feature server to at least one internal function of the communication network.

5. The apparatus of claim 1, wherein based upon the security level, the service delivery element terminates access by the feature server.

6. The apparatus of claim 1, wherein the service delivery element provides scalable levels of access to the communication network by the feature server.

7. The apparatus of claim 1, wherein the service delivery element includes restriction criteria associated with varying degrees of authorization to the communication network by the feature server.

8. The apparatus of claim 7, wherein the restriction criteria comprises one of user based privileges and network operation variables.

9. The apparatus of claim 1, wherein the service delivery element is operable to provide one of access control, connectionless integrity, data origin authentication, replay packet rejection and confidentially services.

10. The apparatus of claim 1, wherein the service delivery element includes a tunnel communication mode.

11. The apparatus of claim 10, wherein the tunnel communication mode comprises of an IP security protocol tunnel mode.

12. The apparatus of claim 1, wherein the service delivery element is configured to recognize a particular feature server.

13. The apparatus of claim 1, wherein the service delivery element establishes a security layer between the communication network and the feature server.

14. The apparatus of claim 1, wherein the service delivery element is operable to establish one of a static association and a dynamic association between the feature server and the communication network.

15. The apparatus of claim 1, wherein the service delivery element is operable to establish both a static association and a dynamic association between the feature server and the communication network at the same time.

16. The apparatus claim 1, wherein the service delivery element is operable to provide an action response to the security level.

17. The apparatus of claim 16, wherein the action comprises one of creating a usage accounting record and providing a message.

18. The apparatus of claim 1, wherein the service delivery element is operable to expand access to the communication network by the feature server.

19. The apparatus of claim 18, wherein the service delivery element expands access to the communication network by the feature server subsequent to a renegotiation of the security level.

20. The apparatus of claim 1, wherein the service delivery element comprises a translation function.

21. A method of interfacing a communication network to a feature server external to the network comprising the steps of:
   providing a service delivery element wherein the service delivery element being within the communication network and having an internal interface to couple the service delivery element to other elements within the communication network, an external interface to couple the service delivery element to the feature server external to the network and an embedded security layer,
   recognizing the feature server via the service delivery element,
   authenticating the feature server for use on the communication network by the embedded security layer,
   providing a secure interface for the at least one feature server to the communication network through the external interface by way of the embedded security layer;
   negotiating a security level between the feature server and the communication network, and
   metering access via the service delivery element by the feature server to the communication network in view of the security level.

22. The method of claim 21, wherein the security level defines a level of access of the feature server to the communication network.

23. The method of claim 21, wherein the method comprises, based upon the security level, restricting access by the feature server to at least one class of data retained within the communication network.

24. The method of claim 21, wherein the method comprises, based upon the security level, restricting access by the feature server to at least one internal function of the communication network.

25. The method of claim 21, wherein the method comprises, based upon the security level terminating access to the communication network by the feature server.

26. The method of claim 21, further comprising scaling levels of access to the communication network by the feature server.

27. The method of claim 21, wherein the service delivery element includes restriction criteria, and wherein the method comprises varying degrees of authorization to the communication network by the feature server in view of the restriction criteria.

28. The method of claim 27, wherein the restriction criteria comprises one of user based privileges the network operation variables.

29. The method of claim 21, the method comprising tunneling data between the feature server and the communication network through the service delivery element.

30. The method of claim 21, wherein the step of recognizing a feature server comprises recognizing a particular feature server.

31. The method of claim 21, comprising establishing a security layer between the communication network and the feature server.

32. The method of claim 21, comprising establishing one of a static association and a dynamic association between the features server and the communication network.

33. The method of claim 21, comprising, in response to a failure to negotiate a security level, providing an action response to the failure to negotiate a security level.

34. The method of claim 33, wherein the action comprises one of creating a usage accounting record, providing a recorded message and linking to a source of additional information.

35. The method of claim 21, comprising expanding access to the communication network by the feature server.

36. The method of claim 21, wherein the step of expanding access to the communication network by the feature server comprises renegotiating the security level.

37. The method of claim 21, further comprising the step of translating data communicated between the feature server and the communication network.

\* \* \* \* \*